UNITED STATES PATENT OFFICE.

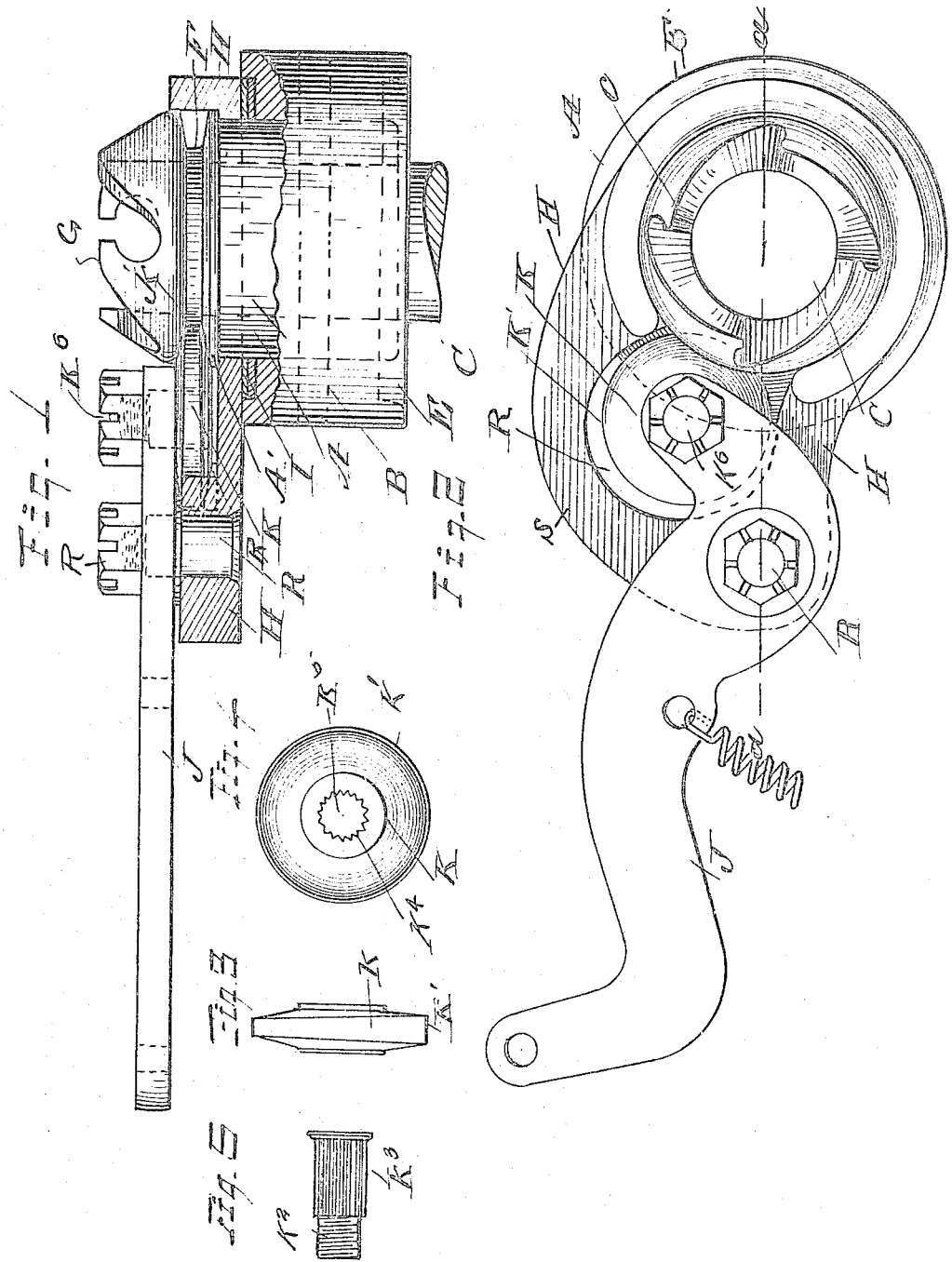

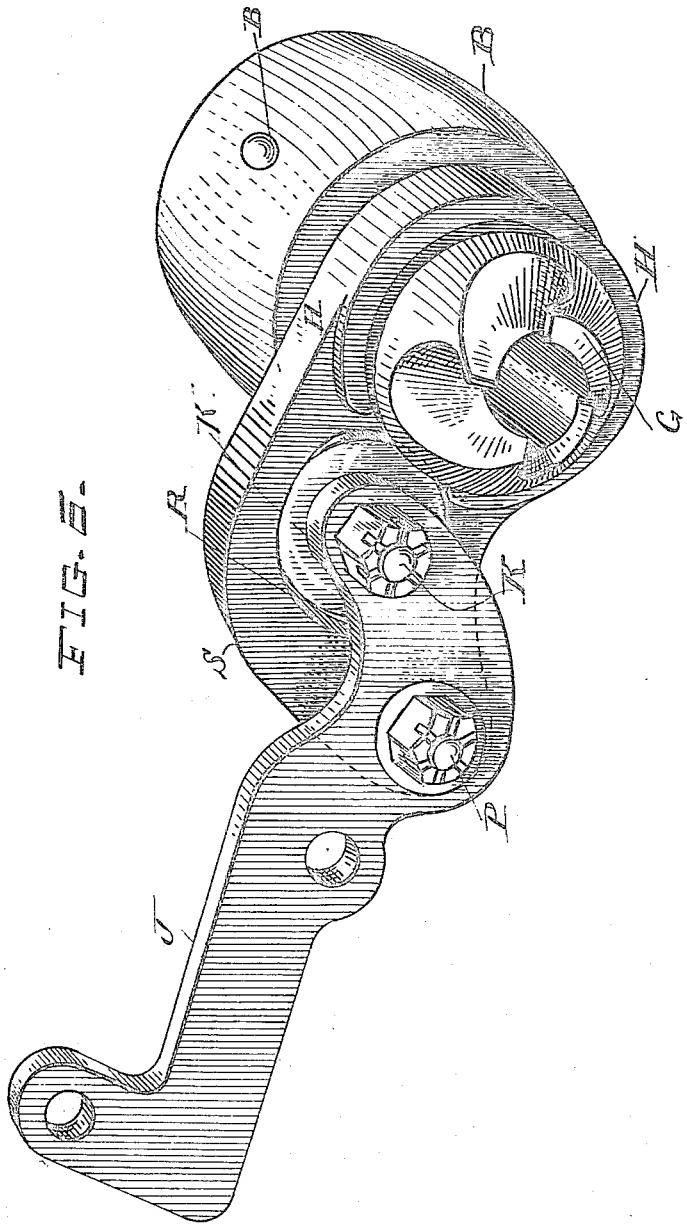

EDWARD D. WOODS, OF CLEVELAND, OHIO, ASSIGNOR, BY MESNE ASSIGNMENTS, TO WOODS STEEL & PROCESS CORPORATION, OF BOSTON, MASSACHUSETTS, A CORPORATION OF MASSACHUSETTS.

CLUTCH.

1,301,530.

Specification of Letters Patent.   Patented Apr. 22, 1919.

Application filed December 15, 1916.   Serial No. 137,173.

*To all whom it may concern:*

Be it known that I, EDWARD D. WOODS, a citizen of the United States, and resident of Cleveland, in the county of Cuyahoga and State of Ohio, have invented certain new and useful Improvements in Clutches, of which I hereby declare the following to be a full, clear, and exact description, such as will enable others skilled in the art to which it appertains to make and use the same.

The objects of the invention are to provide a lever operated clutch in which a cylindrical engaged member is rotated by means of a lever which is pivoted upon a rotatable arm, and is also directly engaged by means of a gripping device or member positioned intermediate of the lever and rotatable clutch member.

In this device the engaging parts of the gripping and cylindrical members are so designed that thin surfaces will make positive contact with each other in such a manner that the frictional contact will increase in power proportionately to the amount of pressure applied, and can not slip.

The invention further includes a separate gripping member adjustably attached to said lever.

It includes means for adjusting the gripping member so that unworn gripping surfaces can be constantly presented to the cylindrical clutch member to maintain the efficiency of the device.

It includes a disk shaped gripping member having a V shaped edge in cross section engaging an annular V shaped groove in the cylindrical clutch member and also a disk shaped gripping member having a V shaped edge in cross section and in which the width of the engaging edge is progressively increased to counteract the effect of wear upon the sides of said groove.

It also includes a clutch lever provided with a gripping member upon one side thereof and pivoted upon a rotatable arm having a recess in which said gripping member is inclosed, in order to give direct action to the gripping member and prevent distortion of the arm.

It includes means for giving increased strength to the arm.

It includes the combination and arrangement of parts and construction of details hereinafter described, shown in the accompanying drawings and specifically pointed out in the claims.

In the accompanying drawings Figure 1 is a side elevation of the device, portions being broken away to show the disk shaped gripping member; Fig. 2 is a plan thereof; Figs. 3 and 4 are plan views of the gripping disk and bolt which secures the disk upon the lever; Fig. 5 is an elevation of said bolt.

Fig. 6 is a perspective of the device.

In these views A is a cylindrical clutch member attached by means of a transverse pin B to a shaft C such as the engine shaft of an automobile so that the device can be employed to obtain the initial cylinder pressure, as an engine starter. E is the fan pulley sleeved over the cylindrical clutch member A.

F is an annular groove of V shape in cross section formed in the cylindrical portion and G is the toothed extremity usually provided for cranking the machine.

H is an arm sleeved over the cylindrical clutch A and retained between the flange or shoulder A' and the pulley E.

A spring washer or washers I, I prevent a too intimate contact between the engaging parts. The arm is rotatable about the cylindrical clutch member upon a common axis.

Pivoted at P to this arm is the lever J which is provided with a gripping member K interposed between the inner end of the lever and the cylindrical clutch member.

This gripping member is provided with a V shaped edge K' corresponding in its cross section with the sides of the V shaped groove F and adapted to make engagement with and rotate the cylindrical member when the clutch is operated.

This gripping member is preferably disk shaped and circumferentially adjustable on its axis so that a fresh gripping edge can be presented to the groove as it becomes worn by use.

This adjustment is effected by means of a bolt $K^2$ having a ribbed or corrugated surface $K^3$ which engages a complementary surface $K^4$ in the sides of the opening $K^5$ in the disk, centrally positioned therein.

To counteract the effects of wear upon the sides of the groove the edge of the disk is progressively thickened so that by rotating the disk a gradually thicker edge can be presented to the sides of the groove to compensate for the wear. This is illustrated in Figs. 3, 4, and 5.

To give a direct and positive gripping action to the disk it is mounted upon the inner side of the lever and a recess R is provided therein in which it moves.

This prevents distortion of the lever by twisting.

The arm is also yoke shaped at S to provide a stop for the lever, and also to reinforce the same and obviates the danger of breaking or bending the lever.

Having described the invention what I claim as new and desire to secure by Letters Patent is:—

1. In a clutch, a cylindrical clutch member, an arm rotatable upon a common axis, a lever pivoted thereon, a grip means intermediate of said lever and cylindrical clutch member, and a separate means for securing said grip member upon said lever, said securing means permitting also of circumferential adjustment of the periphery of said gripping means to counteract the effects of wear.

2. In a clutch, a cylindrical clutch member provided with a circumferential V shaped groove, an arm rotatable upon a common axis, a lever pivoted upon said arm, and a disk mounted upon said lever, said disk provided with a conversely V shaped annular gripping edge adapted to engage with said V shaped groove in said cylindrical clutch member, when said lever is operated, said arm provided with a recess in which said disk moves, said disk provided with an opening, and a device for securing said disk upon said arm, said securing device and the sides of the opening in said disk provided with complementary interacting retaining means whereby the periphery of said disk can be circumferentially adjusted to present fresh wearing surfaces to said cylindrical clutch member.

3. In a clutch, a cylindrical clutch member provided with a circumferential V shaped groove, an arm rotatable upon a common axis, a lever pivoted upon said arm, and a disk mounted upon said lever, said disk provided with a conversely V shaped annular gripping edge adapted to engage with said V shaped groove in said cylindrical clutch member, when said lever is operated, said disk circumferentially adjustable in said lever, and the annular V shaped edge thereof progressively thickened at one edge whereby the amount of wear upon the sides of the V shaped groove can be equalized in the thickened engaging edge of said disk.

In testimony whereof, I hereunto set my hand this 5" day of December, 1916.

EDWARD D. WOODS.

In presence of—
WM. M. MONROE,
CHAS. F. SIPE.